United States Patent
Fages

(10) Patent No.: US 11,506,276 B2
(45) Date of Patent: Nov. 22, 2022

(54) PLANET GEAR ASSEMBLY, EPICYCLIC GEAR TRAIN PROVIDED WITH SUCH AN ASSEMBLY, AND GEARBOX

(71) Applicant: AIRBUS HELICOPTERS, Marignane (FR)

(72) Inventor: Douchane Fages, Saint-Cannat (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/528,503

(22) Filed: Nov. 17, 2021

(65) Prior Publication Data

US 2022/0178437 A1 Jun. 9, 2022

(30) Foreign Application Priority Data

Dec. 7, 2020 (FR) ...................................... 2012773

(51) Int. Cl.
  *F16H 57/08* (2006.01)
  *F16C 19/38* (2006.01)
  *F16C 23/08* (2006.01)
  *F16H 1/28* (2006.01)

(52) U.S. Cl.
  CPC ........... *F16H 57/082* (2013.01); *F16C 19/38* (2013.01); *F16C 23/08* (2013.01); *F16H 1/28* (2013.01); *F16H 2057/085* (2013.01)

(58) Field of Classification Search
  CPC ................. F16H 57/082; F16H 2057/085
  See application file for complete search history.

(56) References Cited

U.S. PATENT DOCUMENTS

| 4,043,216 | A  |   | 8/1977 | Steer |
| 7,056,259 | B2 | * | 6/2006 | Fox ..................... F16C 33/586 |
|           |    |   |        | 475/348 |
| 11,073,193 | B2 | * | 7/2021 | Smook ................. F16H 1/2836 |
| 2011/0136617 | A1 |   | 6/2011 | Lopez et al. |

FOREIGN PATENT DOCUMENTS

| FR | 2287631 A1 | 5/1976 |
| FR | 3068748 A1 | 1/2019 |

OTHER PUBLICATIONS

French Search Report for French Application No. FR2012773, Completed by the French Patent Office, dated Jul. 26, 2021, 9 pages.

* cited by examiner

*Primary Examiner* — Erin D Bishop
(74) *Attorney, Agent, or Firm* — Brooks Kushman P.C.

(57) ABSTRACT

A planet gear assembly comprising a planet carrier provided with at least one crankpin carrying a planet gear, the planet gear comprising a toothing provided with teeth, the toothing being situated around the crankpin and outside the crankpin. A planet gear bearing is arranged at least partially inside the crankpin, the planet gear comprising a foot that extends along an elevation axis at least partially into the crankpin, the planet gear comprising a rim connecting the foot and the toothing, outside the crankpin, the planet gear bearing extending radially from the foot to the internal face of the crankpin.

15 Claims, 3 Drawing Sheets

PLANET GEAR ASSEMBLY, EPICYCLIC GEAR TRAIN PROVIDED WITH SUCH AN ASSEMBLY, AND GEARBOX

CROSS REFERENCE TO RELATED APPLICATIONS

This application claims priority to French patent application No. FR 20 12773 filed on Dec. 7, 2020, the disclosure of which is incorporated in its entirety by reference herein.

TECHNICAL FIELD

The present disclosure relates to a planet gear assembly, an epicyclic gear train provided with such an assembly, and a gearbox provided with such an epicyclic gear train. For example, an aircraft is provided with such an epicyclic gear train.

The disclosure therefore lies in the field of gearing, and in particular gearboxes for a rotorcraft.

BACKGROUND

An epicyclic gear train comprises three members having speeds of rotation that are different, and may even be zero for one of the members. Therefore, an epicyclic gear train conventionally comprises a first toothed member and a second toothed member. At least one toothed planet gear is also carried by a planet carrier. Teeth of each planet gear are at all times meshed with teeth of the first toothed member and teeth of the second toothed member.

An example of an epicyclic gear train comprises a toothed sun gear and a toothed ring gear. Furthermore, the epicyclic gear train comprises a plurality of toothed wheels forming planet gears that are carried by a planet carrier. Teeth of the planet gears mesh successively with the sun gear and with the toothed ring gear. According to an example used in particular on certain helicopters, the ring gear may surround the sun gear. The planet gears are arranged radially between the sun gear and the ring gear. The ring gear may be stationary with respect to a chassis, the sun gear being secured to an input shaft that sets the epicyclic gear train in motion, and the planet carrier being secured to an output shaft.

In this context, a planet carrier may comprise a support carrying the planet gears. Crankpins may be rigidly fastened to the support. The crankpins may be integral with the support or may be secured to the support via a screw/nut system, for example.

Moreover, each planet gear has a toothing. The toothing comprises a hub that extends radially, with respect to an axis of rotation of the planet gear relative to the support, from an inner face to an outer face having the teeth. The toothing is arranged around a planet gear bearing that surrounds the crankpin. The planet gear bearing comprises several rolling elements, for example rollers carried by a cage, which roll on an inner raceway secured to the crankpin and an outer raceway secured to the toothing.

During its operation, an epicyclic gear train is liable to deteriorate, in particular at the interface between the toothing and the planet gear bearing. A crack may thus form at this interface in a toothing of a planet gear. The crack can spread and cause the toothing to open.

The thickness of the toothing can be maximized in order to prevent such an opening from occurring, or the epicyclic gear train can be defined with a tolerance for a toothing possibly opening. These solutions may prove to be heavy and/or bulky.

Document FR 2 287 631 A1 describes an assembly provided with a planet carrier. This planet carrier comprises two crankpins through which a torsionally flexible element passes. Two planet gears are respectively meshed by the two ends of the flexible element via splines. Each planet gear comprises a toothing surrounding the corresponding crankpin, a needle bearing being arranged between the crankpin and the toothing.

Documents US 2011/136617 A1 and FR 3 068 748 A1 are also known.

SUMMARY

An object of the present disclosure is therefore to propose a planet carrier carrying a planet gear that aims to limit the dangers of wear at an interface with a planet gear bearing.

The disclosure relates to a planet gear assembly comprising a planet carrier, said planet carrier comprising at least one crankpin carrying a planet gear of said planet gear assembly, said crankpin being hollow and comprising a wall extending radially with respect to an axis referred to for convenience as an "elevation" axis and in a first direction from an internal face to an external face, said planet gear comprising a toothing provided with teeth, the toothing being situated around the crankpin and outside the crankpin.

A planet gear bearing of said planet gear assembly is arranged at least partially inside the crankpin, said planet gear comprising a foot that extends along an elevation axis at least partially into the crankpin, said planet gear comprising a rim connecting the foot and the toothing at least partially outside the crankpin, said planet gear bearing extending radially with respect to said elevation axis and in said first direction from an outer face of the foot to the internal face, said planet gear bearing comprising at least one row of rolling elements.

The rim may be a part of the planet gear integral with the foot and the toothing, these three members forming a planet gear.

This planet gear assembly therefore has a planet gear provided with a toothed toothing that surround a crankpin, and with a foot that penetrates into the crankpin. A planet gear bearing is then interposed, in the crankpin, between the foot and the crankpin. Conversely, the toothing is, for example, separated from the external face of the wall of the crankpin by an empty space.

Optionally, the planet carrier may comprise several planet gears of this type, each comprising a foot which penetrates into a respective crankpin.

The term "toothing" denotes a member that is rotatably movable and comprises teeth. The toothing may comprise a hub, for example a cylindrical hub, carrying the teeth.

Consequently, the planet gear according to the disclosure is in contact with a planet gear bearing via its foot arranged in the crankpin, and not via its toothing. The wheel may possibly become worn at the interface between this planet gear and the planet gear bearing, i.e., at the foot. Such wear may then cause a crack to appear in the foot, but not in the toothed toothing. There is no danger of the foot opening, in particular because it is arranged in the crankpin. As a result, the risk of the toothed toothing opening is minimized, or even eliminated.

Furthermore, the crankpin may easily be sized in such a way as to prevent a crack forming at the interface between this crankpin and the planet gear bearing.

Furthermore, degradation of the planet gear bearing by spalling occurs in the crankpin, which reduces the risk of degradation to the toothed toothing with the debris.

According to another aspect, this planet gear assembly is relatively simple and makes the use of oversized parts avoidable. This planet gear assembly can have a relatively low mass impact compared to a conventional assembly. Its use in the context of an aircraft for which the mass aspect is of great importance is therefore conceivable.

Similarly, the planet gear assembly according to the disclosure may have a limited impact from the point of view of its space requirement.

The planet gear assembly may also comprise one or more of the following features.

According to one possibility, a single planet gear bearing may be arranged at least partially inside the crankpin.

Indeed, the planet gear can cooperate with a single planet gear bearing, namely the planet gear bearing interposed between the foot and the internal face of the crankpin. In particular, the space requirement, manufacture and/or mass of the planet gear assembly can then be optimized.

According to a possibility compatible with the preceding possibilities, the planet gear bearing may be a self-aligning bearing.

Therefore, the planet gear has not only freedom of movement in rotation through 360 degrees about the elevation axis, but also limited freedom of movement in rotation about two axes perpendicular to the elevation axis.

A self-aligning bearing offers the planet gear additional freedom of movement relative to the crankpin. This additional freedom of movement may make it possible to reduce the forces that arise due to the static indeterminacy of a mechanical system comprising an epicyclic gear train.

According to a possibility compatible with the preceding possibilities, said planet gear bearing can comprise two rows of rolling elements and, for example, two rows each comprising rollers arranged in a spherical shape.

Such a bearing may make it possible, in particular, to obtain a self-aligning bearing.

According to a possibility compatible with the preceding possibilities, said planet gear bearing may comprise an outer raceway integral with the internal face or an outer ring adjoining the internal face.

The expression "outer raceway integral with the internal face" means that the internal face comprises the outer raceway.

The bearing may include one outer raceway for each rolling row.

According to a possibility compatible with the preceding possibilities, said planet gear bearing may comprise at least one inner raceway integral with the outer face of the foot or an inner ring adjoining the outer face of the foot.

The expression "inner raceway integral with the foot" means that the outer face of the foot comprises the inner raceway.

The bearing may include one inner raceway for each rolling row.

According to a possibility compatible with the preceding possibilities, said planet gear bearing may therefore comprise an outer ring adjoining the internal face and an inner ring adjoining the outer face of the foot. Optionally, the planet gear bearing can be immobilized along the elevation axis between a first shoulder of the crankpin bearing against the outer ring and a second shoulder of the foot bearing against the inner ring.

Such a fastening system has the advantage of being simple and relatively lightweight.

According to a possibility compatible with the preceding possibilities, a seat may be attached to the crankpin and a fastener may be attached to the foot, said outer ring being arranged axially in a second direction of the elevation axis between said seat and said first shoulder, said inner ring being arranged axially in said second direction between said second shoulder and said fastener.

According to a possibility compatible with the preceding possibilities, the foot may extend in a second direction of the elevation axis from a base towards a top, said toothing extending in said second direction of the elevation axis from a base portion towards a top portion, said rim connecting said base portion to said base.

The planet gear can then be positioned easily by pushing the foot into the crankpin. The space requirement of the assembly is also minimized.

According to a possibility compatible with the preceding possibilities, said wall of the crankpin can be positioned radially between said top portion and said top.

According to a possibility compatible with the preceding possibilities, the rim may be annular in shape. The rim may be in the form of an annular disk that extends from the foot to the toothing.

According to a possibility compatible with the preceding possibilities, the toothing and said foot and said rim form a one-piece component.

According to another aspect, an epicyclic gear train may comprise a planet gear assembly according to the disclosure and, in particular, a planet gear assembly having one or more of the preceding features.

According to one possibility, the epicyclic gear train may comprise a ring gear and a sun gear, said toothing being meshed with the ring gear and the sun gear, said ring gear being stationary, for example, with respect to a chassis.

According to another aspect, a gearbox may comprise such an epicyclic gear train.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
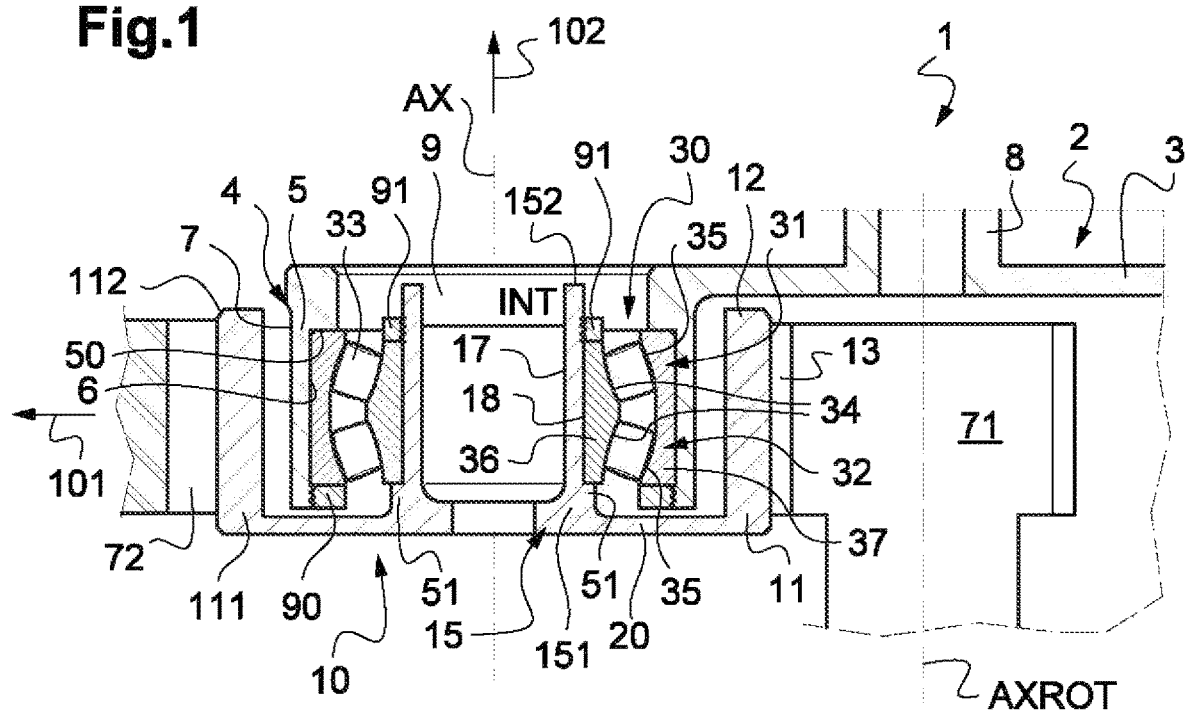
FIG. 1 is a cross-sectional view of a planet gear assembly according to the disclosure with a two-ring planet gear bearing.

FIG. 1 shows a planet gear assembly 1 according to the disclosure.

This planet gear assembly 1 comprises a planet carrier 2 that is rotatably movable about an axis of rotation AXROT. The planet carrier 2 carries one or more planet gears 10. For this purpose, the planet carrier 2 comprises at least one crankpin 4 and, for example, one crankpin 4 for each planet gear 10. The following paragraphs refer to a crankpin 4 and a planet gear 10 according to the disclosure. When several crankpins 4 and several respective planet gears 10 are present, each crankpin 4 and each planet gear 10 may have the following features.

Thus, a crankpin 4 according to the disclosure may be constrained to rotate, about the axis of rotation AXROT, with a support 3 of the planet carrier 2. For example, such a support 3 comprises a plate. The planet carrier 2 may also comprise a planet gear shaft 8 constrained to rotate with the support 3 about the axis of rotation AXROT. Optionally, the crankpin or crankpins 4 and the support 3 and/or the planet gear shaft 8 form a one-piece component. Alternatively, a crankpin 4 may be fastened to the support 3 in a conventional manner.

Irrespective of these features, a crankpin 4 according to the disclosure extends from the support 3 along an elevation axis AX. This elevation axis AX may be an axis of symmetry of the crankpin 4 and/or may be parallel to the axis of rotation AXROT. For example, the crankpin 4 comprises a wall 5 secured to the support 3. This wall 5 may be cylindrical in shape with a circular base. In addition, the crankpin 4 is hollow. Thus, the wall 5 can extend radially, with respect to the elevation axis AX and in a first direction 101, from an internal face 6 surrounding an inner space INT present in the crankpin 4 to an external face 7.

The support 3 may comprise a bore 9 opening into the inner space INT.

Furthermore, a crankpin 4 according to the disclosure cooperates with a planet gear 10 according to the disclosure. The planet gear 10 is rotatably movable, about the elevation axis AX, relative to the crankpin 4 that carries it. In addition, the planet gear 10 is rotatably movable with the planet carrier 2 about the axis of rotation AXROT.

The planet gear 10 comprises a toothing 11 that is situated around the crankpin 4, and therefore outside the inner space INT delimited by the crankpin 4. The toothing 11 is toothed. For example, the toothing 11 comprises a cylindrical hub 12. The hub 12 may extend radially, with respect to the elevation axis AX and in the first direction 101, from an annular face, which may be smooth, for example, to a periphery carrying the teeth 13. The annular face is arranged around and facing the external face 7 of the wall 5 of the crankpin 4.

Furthermore, the toothing 11 may extend in a direction of the elevation axis AX referred to for convenience as the "second direction 102", from a base portion 111 to a top portion 112. The top portion 112 may surround the crankpin 4. On the other hand, the base portion 111 may project away from the crankpin 4, in a direction opposite the second direction 102, along the elevation axis AX.

Furthermore, the planet gear 10 comprises a foot 15.

The foot 15 extends along the elevation axis AX at least partially into the crankpin 4, namely in the inner space INT. For example, the foot 15 comprises a cylinder 16. The foot is provided with an outer face 18 facing the internal face 6 in the inner space INT. Optionally, the foot 15 may be hollow, extending radially, in the first direction 101 and with respect to the elevation axis AX, from an inner face 17 to the outer face 18. For example, the foot 15 may extend in the second direction 102 from a base 151 to a top 152. The top 152 may be surrounded by the crankpin 4, or may emerge from the crankpin 4 through the bore 9. The wall 5 of the crankpin 4 is thus positioned radially, with respect to the elevation axis AX, between said top portion 112 of the toothing 11 and the top 152. On the other hand, the base 151 may project away from the crankpin 4, in a direction opposite the second direction 102, along the elevation axis AX.

Furthermore, the planet gear 10 may comprise a rim 20 connecting the foot 15 and the toothing 11, at least partially outside the crankpin 4. For example, the rim 20 is annular in shape. The rim 20 may, where appropriate, be fastened to the base portion 111 of the toothing 11 and to the base 151 of the foot 15.

Optionally, the toothing 11 and the foot 15 and the rim 20 may form a one-piece component or, on the contrary, a plurality of parts fastened to each other.

Furthermore, at least one or indeed a single planet gear bearing 30 cooperates with the crankpin 4 and the planet gear 10. The planet gear bearing 30 is arranged at least partially, or indeed entirely, in the inner space INT of the crankpin 4 so as to be interposed between the crankpin 4 and the foot 15.

According to one aspect, the planet gear bearing 30 includes at least one row 31, 32 of rolling elements 33. Such rolling elements 33 may be rollers carried by a cage. The rollers roll on an inner raceway 34 and an outer raceway 35 that surrounds the inner raceway 34.

Figure 2:
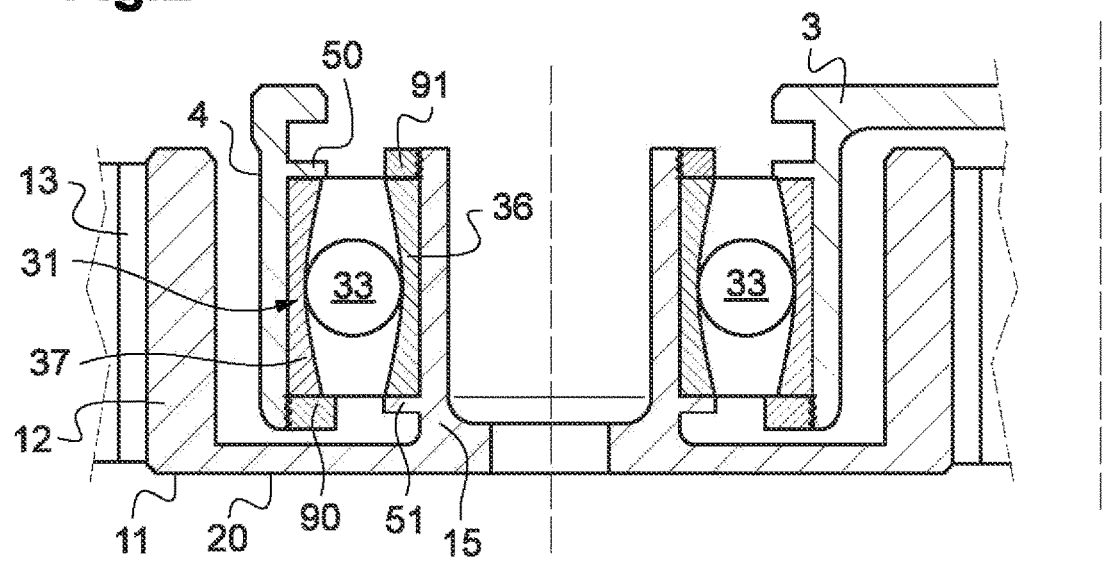
FIG. 2 is a cross-sectional view of a planet gear assembly according to the disclosure with a planet gear bearing with one row of rolling elements.

FIG. 2 shows an example of a planet gear bearing 30 having a single row of rolling elements 33.

According to the examples shown in FIGS. 1, 3, 4 and 5, the planet gear bearing 30 may be a self-aligning bearing comprising, for example, two rows 31, 32 arranged on either side of a plane orthogonal to the elevation axis AX. The rollers of the two rows 31, 32 can describe a spherical shape.

Furthermore, the planet gear bearing 30 extends radially, in respect of the elevation axis AX and in the first direction 101, from the outer face 18 of the foot 15 to the internal face 6 of the wall 5 of the crankpin 4. The planet gear bearing 30 thus comprises a member adjoining or even integral with the outer face 18 and a member adjoining or even integral with the internal face 6.

Thus, the planet gear bearing 30 comprises at least one outer raceway 35 that may be integral with an outer ring 37 adjoining the internal face 6.

For example, the outer ring 37 bears axially against a first shoulder 50 of the crankpin 4. This first shoulder 50 extends radially from the internal face 6 towards the elevation axis AX. The outer ring 37 may rest on a removable seat 90. Such a seat 90 may, for example, comprise an elastic ring referred to as a circlip, for example, wedged into a groove of the wall 5 of the crankpin 4, or a nut with external thread screwed into a thread of the internal face 6 of the wall 5 of the crankpin 4. If necessary, the nut of the seat 90 may be a positive locking nut. Thus, the outer ring 37 extends in the second direction 102 from the seat 90 to the first shoulder 50.

Figure 4:
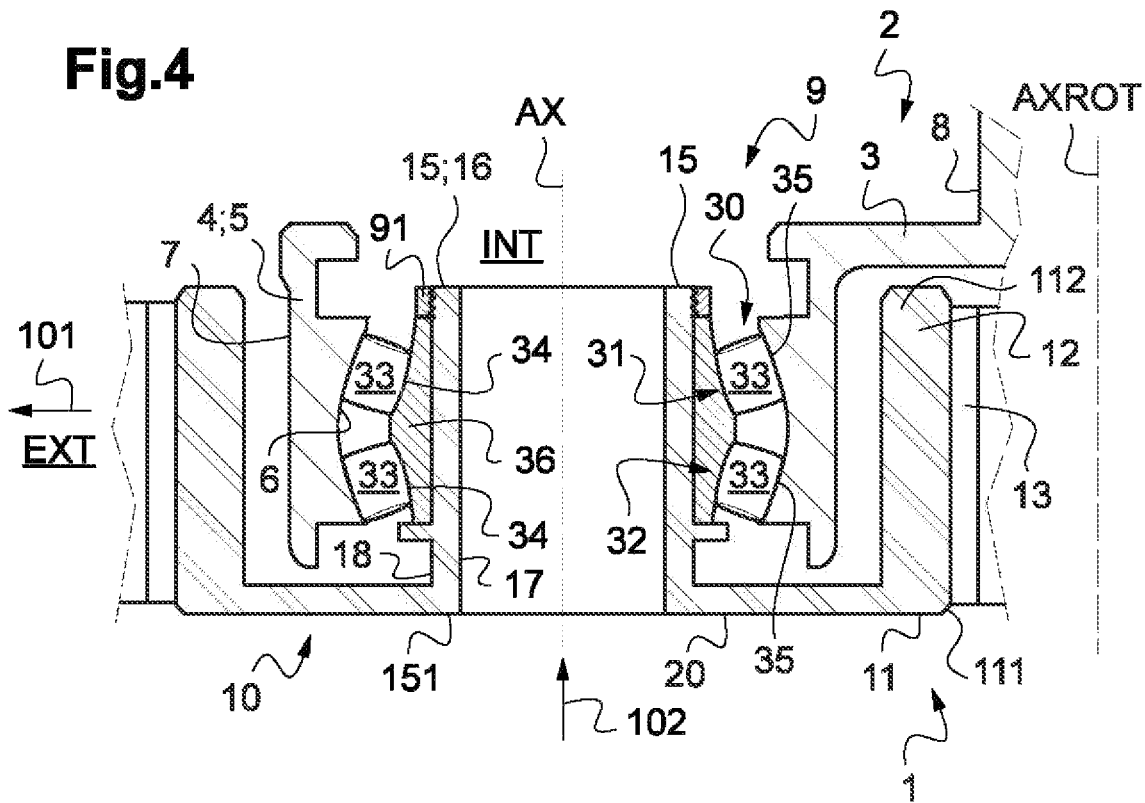
FIG. 4 is a partial cross-sectional view of a planet gear assembly according to the disclosure with a planet gear bearing having an inner ring.
Figure 5:
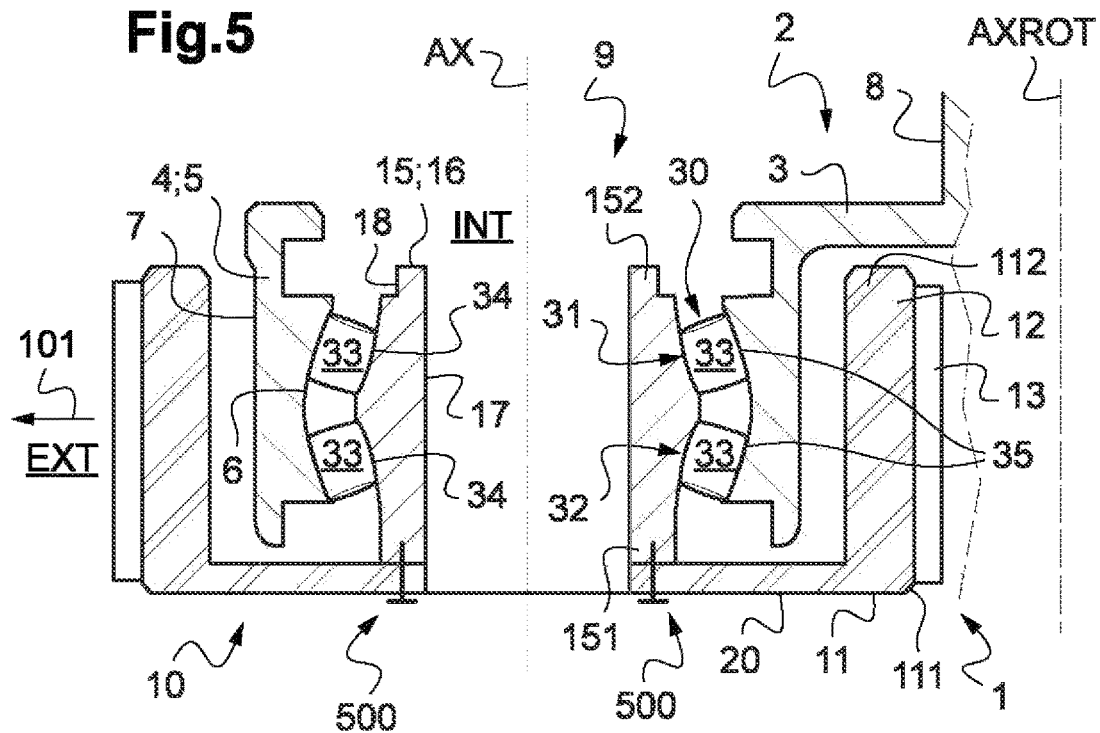
FIG. 5 is a partial cross-sectional view of a planet gear assembly according to the disclosure with a planet gear bearing with integral raceways.

According to FIGS. 4 and 5, the outer raceway 35 may be integral with the crankpin 4, being a part of the internal face 6.

With reference once more to FIG. 1, the planet gear bearing 30 may comprise at least one inner raceway 34 that may be integral with an inner ring 36 adjoining the outer face 18 of the foot 15.

For example, the inner ring 36 bears axially against a second shoulder 51 of the foot 15. This second shoulder 51 extends radially from the outer face 18 towards the internal face 6. The inner ring 36 may bear against a removable fastener 91. Such a fastener 91 may, for example, comprise an elastic ring, wedged into a groove of the foot 15, or a nut with internal thread screwed onto a thread of the outer face 18 of the foot 15. Thus, the inner ring 36 extends in the second direction 102 from the second shoulder 51 to the fastener 91 cooperating with the foot 15. If necessary, the nut of the fastener 91 may be a positive locking nut.

Figure 3:
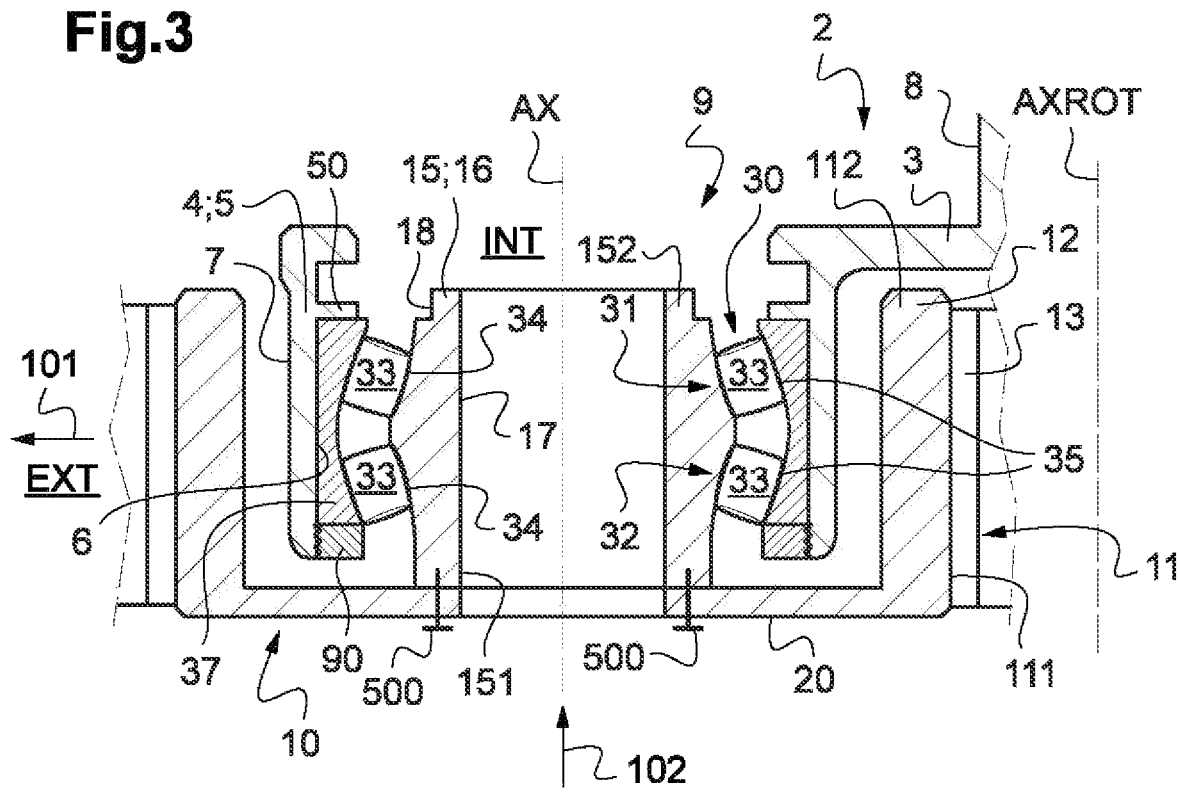
FIG. 3 is a partial cross-sectional view of a planet gear assembly according to the disclosure with a planet gear bearing having an outer ring.

According to FIGS. 3 and 5, the inner raceway 34 may be integral with the foot 15, being a part of the outer face 18.

Thus, FIG. 1 and FIG. 2 show an assembly according to the disclosure provided with planet gear bearings 30 having an inner ring 36 and an outer ring 37.

In order to mount the planet gear 10 of FIG. 1, the planet gear bearing 30 can be inserted into the crankpin 4 in the second direction 102. The seat 90 is then positioned to hold the outer ring 37 of the planet gear bearing 30 axially. The foot 15 is then inserted into the crankpin 4 and the inner ring 36 of the planet gear bearing 30 in the second direction 102 until the second shoulder 51 is arranged against the inner ring 36. An operator can then arrange the fastener 91 by passing it through the bore 9.

In this case, the planet gear 10 may be one-piece or may comprise several parts.

FIG. 3 shows an example having a planet gear bearing 30 having an outer ring 37 and an inner raceway 34 integral with the foot.

Consequently, the rolling rows 31, 32 and the outer ring 37 can be mounted on the foot 15 in a conventional manner. The sub-assembly formed in this way is inserted into the inner space INT, by pressing the outer ring 37 against the first shoulder 50. The seat 90 is then fastened by screwing the nut with external thread as in the example shown.

In this case, the planet gear 10 may comprise several parts. For example, the rim 20 and the toothing 11 form one and the same part fastened to the foot by conventional means 500, for example via screws.

FIG. 4 shows an example having a planet gear bearing 30 having an inner ring 36 and an outer raceway integral with the crankpin.

Consequently, the rolling rows 31, 32 and the inner ring 36 can be mounted on the crankpin in a conventional manner. The foot 15 of the planet gear is inserted into the inner space INT, by pressing the second shoulder 51 against the inner ring 36. The fastener 91 is then fastened to the foot 15 by screwing the nut with internal thread as in the example shown.

In this case, the planet gear 10 may be one-piece or may comprise several parts.

FIG. 5 shows an example having a planet gear bearing 30 having an inner raceway integral with the foot and an outer raceway integral with the crankpin.

The cages of the rows 31, 32 of rolling elements 33 can then be positioned in the inner space INT. The rolling elements 33 are then arranged in the cages. Finally, the foot 15 is inserted into the inner space INT, possibly following a step of thermally expanding the system.

In this case, the planet gear 10 may comprise several parts. For example, the rim 20 and the toothing 11 form one and the same part fastened to the foot by conventional means 500, for example via screws.

Irrespective of the embodiment, the foot 15 is therefore in contact with the planet gear bearing 30. Wear at the interface between the planet gear 10 and the planet gear bearing 30 therefore does not degrade the toothing 11.

According to another aspect, the planet gear assembly 1 may be installed in an epicyclic gear train 70.

For example, the epicyclic gear train 70 includes a ring gear 72 and a sun gear 71. The teeth of the toothing 11 of the planet gear 10 then mesh with the teeth of the ring gear 72 and the sun gear 71.

For example, the ring gear 72 surrounds the sun gear 71, each planet gear 10 being arranged between the sun gear 71 and the ring gear 72.

The sun gear 71 and/or the ring gear 72 have/has, for example, a degree of freedom to rotate about an axis of rotation AXROT. The toothed sun gear 71 and said toothed ring gear 72 are arranged coaxially with respect to each other.

Figure 6:
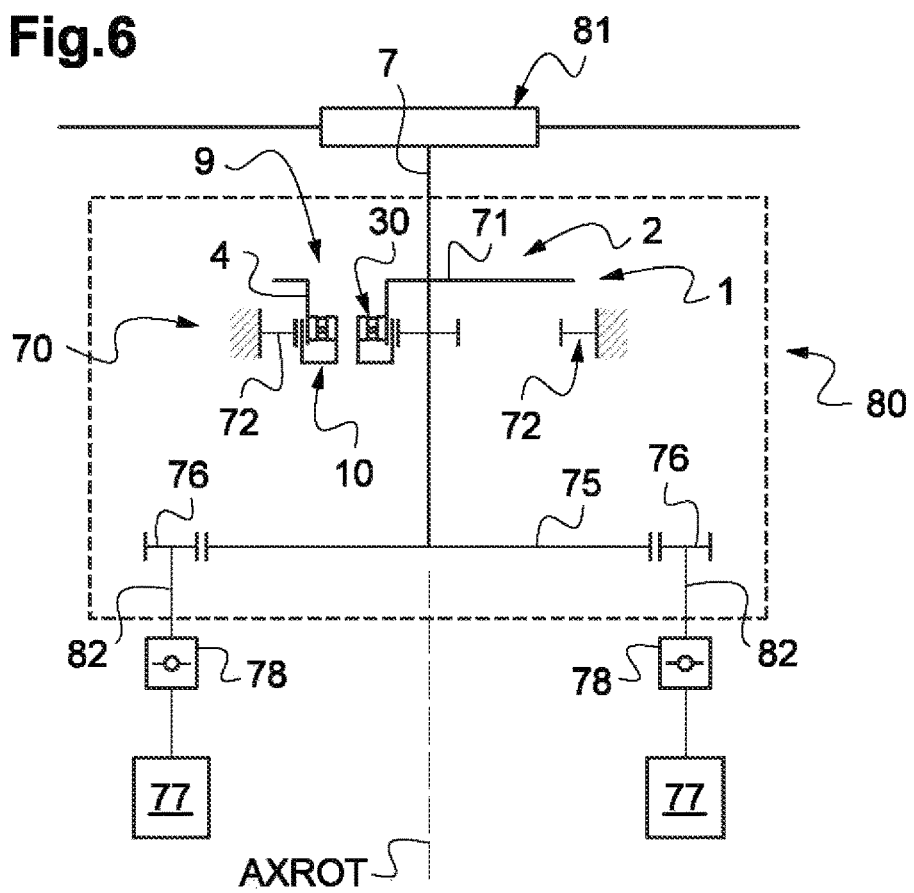
FIG. 6 is a view showing an epicyclic gear train according to the disclosure.

In reference to FIG. 6, an epicyclic gear train 10 may be arranged in a gearbox 80 and/or on an aircraft and, in particular, on an aircraft that is provided with a rotary wing 81. For example, the aircraft 1 comprises at least one engine 77 that rotates the members of a gearbox 80, the gearbox 80 rotating the rotary wing 81. For example, the gearbox 80 comprises one input shaft 82 for each engine, each input shaft being connected to an engine 77 by a conventional free-wheel 78. For example, each input shaft 82 rotates a pinion 76 that meshes with a combining gear 75. According to this example, this combining gear 75 then rotates the sun gear 71 of an epicyclic gear train 70 according to the disclosure, the planet carrier 2 of this epicyclic gear train 70 being connected to the rotary wing 81 by a rotor mast 7.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the claims.

What is claimed is:

1. A planet gear assembly comprising a planet carrier, the planet carrier comprising at least one crankpin carrying a planet gear of the planet gear assembly, the crankpin being hollow and comprising a wall extending radially with respect to an elevation axis and in a first direction from an internal face to an external face, the planet gear comprising a toothing provided with teeth, the toothing being situated around the crankpin and outside the crankpin,
wherein a planet gear bearing of the planet gear assembly is arranged at least partially inside the crankpin, the planet gear comprising a foot that extends along the elevation axis, the foot extending at least partially into the crankpin, the planet gear comprising a rim connecting the foot and the toothing at least partially outside the crankpin, the planet gear bearing extending radially with respect to the elevation axis and in the first direction from an outer face of the foot to the internal face, the planet gear bearing comprising at least one row of rolling elements.

2. The planet gear assembly according to claim 1 wherein the planet gear bearing is a self-aligning bearing.

3. The planet gear assembly according to claim 1 wherein the planet gear bearing includes two rows of rolling elements.

4. The planet gear assembly according to claim 1 wherein the planet gear bearing comprises at least one outer raceway integral with the internal face or an outer ring adjoining the internal face.

5. The planet gear assembly according to claim 1 wherein the planet gear bearing comprises at least one inner raceway integral with the outer face of the foot or an inner ring adjoining the outer face of the foot.

6. The planet gear assembly according to claim 1 wherein the planet gear bearing comprises an outer ring adjoining the internal face and an inner ring adjoining the outer face of the foot, the planet gear bearing being immobilized along the elevation axis between a first shoulder of the crankpin bearing against the outer ring and a second shoulder of the foot bearing against the inner ring.

7. The planet gear assembly according to claim 6 wherein a seat is attached to the crankpin and a fastener is attached to the foot, the outer ring being arranged axially in a second direction of the elevation axis between the seat and the first shoulder, the inner ring being arranged axially in the second direction between the second shoulder and the fastener.

8. The planet gear assembly according to claim 1 wherein the foot extends in a second direction of the elevation axis from a base towards a top, the toothing extending in the second direction of the elevation axis from a base portion towards a top portion, the rim connecting the base portion to the base.

9. The planet gear assembly according to claim 8 wherein the wall is positioned radially between the top portion and the top.

10. The planet gear assembly according to claim 1 wherein the rim is annular in shape.

11. The planet gear assembly according to claim 1 wherein the toothing and the foot and the rim form a one-piece component.

12. The planet gear assembly according to claim 1 wherein a single planet gear bearing is arranged at least partially inside the crankpin.

13. An epicyclic gear train, wherein the epicyclic gear train comprises the planet gear assembly according to claim 1.

14. The epicyclic gear train according to claim 13 wherein the epicyclic gear train comprises a ring gear and a sun gear, the toothing being meshed with the ring gear and the sun gear, the ring gear being stationary.

15. A gearbox, wherein the gearbox comprises the epicyclic gear train according to claim 13.

* * * * *